United States Patent

Ruan et al.

(10) Patent No.: US 7,901,563 B2
(45) Date of Patent: Mar. 8, 2011

(54) PREPARATION OF INDUSTRIAL ASPHALT

(75) Inventors: Yonghong Ruan, Wayne, NJ (US); William K. Longcor, IV, Stillwater, NJ (US); Peter Lars Johnson, Wayne, NJ (US)

(73) Assignee: Building Materials Investment Corporation, Dallas, TX (US)

( * ) Notice: Subject to any disclaimer, the term of this patent is extended or adjusted under 35 U.S.C. 154(b) by 476 days.

(21) Appl. No.: 11/345,184

(22) Filed: Feb. 1, 2006

(65) Prior Publication Data

US 2007/0131578 A1 Jun. 14, 2007

(51) Int. Cl.
*C10G 27/00* (2006.01)
*C10G 3/00* (2006.01)

(52) U.S. Cl. .......... 208/6; 208/4; 208/5; 208/22; 208/23; 208/44; 106/273 R; 106/280; 106/281 R; 106/284.1

(58) Field of Classification Search .......... 208/4, 5, 208/6, 22, 23, 44; 106/284.1, 273 R, 280, 106/281 R
See application file for complete search history.

(56) References Cited

U.S. PATENT DOCUMENTS

| | | | | |
|---|---|---|---|---|
| 1,782,186 A | 11/1930 | Abson | | 208/5 |
| 2,179,208 A | 11/1939 | Burk et al. | | 208/4 |
| 2,200,914 A | 5/1940 | Burk et al | | 208/4 |
| 2,375,117 A | 5/1945 | Lentz | | 208/22 |
| 2,450,756 A | 10/1948 | Holberg | | 208/4 |
| 2,762,755 A | 9/1956 | Kinnaird | | 208/6 |
| 2,886,506 A | * 5/1959 | Brown et. al. | | 208/5 |
| 2,906,687 A | * 9/1959 | Roediger et al. | | 208/5 |
| 3,126,329 A | 3/1964 | Fort | | 208/4 |
| 3,751,278 A | * 8/1973 | Alexander | | 106/284.1 |
| 4,338,137 A | 7/1982 | Goodrich | | 106/284.2 |
| 4,584,023 A | 4/1986 | Goodrich | | 106/273.1 |
| 4,693,752 A | * 9/1987 | Elias | | 106/280 |

* cited by examiner

*Primary Examiner* — Prem C Singh
(74) *Attorney, Agent, or Firm* — William J. Davis; Alvin T. Rockhill

(57) ABSTRACT

The present invention relates to a method for preparing an industrial asphalt comprising (1) heating an asphalt flux to a temperature which is within the range of about 400° F. (204° C.) to 550° F. (288° C.) to produce a hot asphalt flux, (2) sparging an oxygen containing gas through the hot asphalt flux for a period of time which is sufficient to increase the softening point of the asphalt flux to a value of at least 100° F. (38° C.), to produce an underblown asphalt composition; and (3) mixing a sufficient amount of a polyphosphoric acid throughout the underblown asphalt composition while the underblown asphalt composition is maintained at a temperature which is within the range of 200° F. (93° C.) to 550° F. (288° C.) to attain a softening point which is within the range of 185° F. (85° C.) to 250° F. (121° C.) and a penetration value of at least 15 dmm at 77° F. (25° C.) to produce the industrial asphalt.

18 Claims, No Drawings

PREPARATION OF INDUSTRIAL ASPHALT

BACKGROUND OF THE INVENTION

Asphalt offers outstanding binding and waterproofing characteristics. These physical attributes of asphalt have led to its widespread utilization in paving, roofing, and waterproofing applications. For instance, asphalt is used in manufacturing roofing shingles because it has the ability to bind sand, aggregate, and fillers to the roofing shingle while simultaneously providing excellent water barrier characteristics.

Naturally occurring asphalts have been used in various applications for hundreds of years. However, today almost all of the asphalt used in industrial applications is recovered from the refining of petroleum. Asphalt, or asphalt flux is essentially the residue that remains after gasoline, kerosene, diesel fuel, jet fuel, and other hydrocarbon fractions have been removed during the refining of crude oil. In other words, asphalt flux is the last cut from the crude oil refining process.

To meet performance standards and product specifications, asphalt flux that is recovered from refining operations is normally treated or processed to attain desired physical characteristics and to attain uniformity. For instance, asphalt that is employed in manufacturing roofing products has to be treated to meet the special requirements demanded in roofing applications. More specifically, in the roofing industry it is important to prevent asphaltic materials from flowing under conditions of high temperature such as those encountered during hot summers. In other words, the asphaltic materials used in roofing products should maintain a certain level of stiffness (hardness) at high temperatures. This increased level of stiffness is characterized by a reduced penetration, an increased viscosity, and an increased softening point.

To attain the required level of stiffness and increased softening point that is demanded in roofing applications the asphalt flux is typically treated by an air blowing process. In such air blowing techniques, air is blown through the asphalt flux for a period of about 2 to about 8 hours while it is maintained at an elevated temperature which is typically within the range of 400° F. (204° C.) to 550° F. (288° C.). The air blowing process results in the stiffness and the softening point of the asphalt flux being significantly increased. This is highly desirable because ASTM D 3462-96 (Standard Specification for Asphalt Shingles Made from Glass Felt and Surfaced with Mineral Granules) requires roofing asphalt to have a softening point which is within the range of 190° F. (88° C.) to 235° F. (113° C.) and for the asphalt to exhibit a penetration at 77° F. (25° C.) of above 15 dmm (1 dmm=0.1 mm). In fact, it is typically desirable for asphalt used in roofing applications to have a penetration which is within the range of 15 dmm to 35 dmm in addition to a softening point which is within the range of 185° F. (85° C.) to 235° F. (113° C.).

Air blowing has been used to increase the softening point and stiffness of asphalt since the early part of the twentieth century. For example, U.S. Pat. No. 2,179,208 describes a process wherein asphalt is air blown at a temperature of 300° F. (149° C.) to 500° F. (260° C.) in the absence of a catalyst for a period of 1 to 30 hours after which time a polymerization catalyst is added for an additional treatment period of 20 to 300 minutes at a temperature of 225° F. (107° C.) to 450° F. (232° C.). Over the years a wide variety of chemical agents have been used as air blowing catalysts. For instance, ferric chloride, $FeCl_3$ (see U.S. Pat. No. 1,782,186), phosphorous pentoxide, $P_2O_5$ (see U.S. Pat. No. 2,450,756), aluminum chloride, $AlCl_3$ (see U.S. Pat. No. 2,200,914), boric acid (see U.S. Pat. No. 2,375,117), ferrous chloride, $FeCl_2$, phosphoric acid, $H_3PO_4$ (see U.S. Pat. No. 4,338,137), copper sulfate CuSO, zinc chloride $ZnCl_2$, phosphorous sesquesulfide, $P_4S_3$, phosphorous pentasulfide, $P_2S_5$, and phytic acid, $C_6H_6O_6(H_2PO_3)_6$ (see U.S. Pat. No. 4,584,023) have all been identified as being useful as air blowing catalysts.

Several patents describe the application of phosphoric mineral acids in modifying asphalt properties. For instance, U.S. Pat. No. 2,450,756 describes a process to make oxidized asphalts by air blowing petroleum hydrocarbon in the presence of a phosphorus catalyst, including phosphorus pentoxide, phosphorus sulfide, and red phosphorus. U.S. Pat. No. 2,762,755 describes a process of air blow asphaltic material in the presence of a small amount of phosphoric acid. U.S. Pat. No. 3,126,329 discloses a method of making blown asphalt through air blowing in the presence of a catalyst which is an anhydrous solution of 50 weight percent to 80 weight percent phosphorus pentoxide in 50 weight percent to 20 weight percent phosphoric acid having the general formula $H_mR_nPO_4$.

All of the air blowing techniques described in the prior art share the common characteristic of both increasing the softening point and decreasing the penetration value of the asphalt flux treated. In other words, as the asphalt flux is air blown, its softening point increases and its penetration value decreases over the duration of the air blowing procedure. It has been the conventional practice to air blow asphalt flux for a period of time that is sufficient to attain the desired softening point and penetration value. However, in the case of some asphalt fluxes, air blowing to the desired softening point using conventional procedures results in a penetration value which is too low to be suitable for utilization in roofing applications. These asphalt fluxes are called "hard asphalt fluxes". In other words, hard asphalt fluxes cannot be air blown using conventional procedures to a point where both the required softening point and penetration values are attained. Accordingly, today there is a need for a process that can be used to air blow hard asphalt flux to both a softening point which is within the ranged of 185° F. (85° C.) to 250° F. (121° C.) and a penetration value at 77° F. (25° C.) of above 15 dmm.

SUMMARY OF THE INVENTION

This invention is based upon the discovery that polyphosphoric acid can be used to alter the relationship between the change in softening point and the change in penetration value that is normally attained by the conventional air blowing of asphalt flux. It has been found that polyphosphoric acid can be used to treat asphalt flux to produce industrial asphalt which has a softening point within the range of 185° F. (85° C.) to 250° F. (121° C.) and a penetration value at 77° F. (25° C.) of above 15 dmm.

By utilizing the technique of this invention, the air blow time required to produce industrial asphalt for utilization in roofing applications can be reduced. Accordingly, utilizing the technique of this invention increases the capacity of air blowing units and also reduces the energy consumption required to produce industrial asphalt. Because the asphalt flux is air blown for shorter period of time the amount of blow loss (asphalt lost during the air blowing procedure) is reduced as is the amount of material emitted into the environment. Accordingly, the technique of this invention reduces the cost of raw materials and lessens the environmental impact of the air blowing procedure.

The subject invention more specifically discloses a method for preparing an industrial asphalt comprising (1) heating an asphalt flux to a temperature which is within the range of about 400° F. (204° C.) to 550° F. (288° C.) to produce a hot asphalt flux, (2) sparging an oxygen containing gas through the hot asphalt flux for a period of time which is sufficient to increase the softening point of the asphalt flux to a value of at least 100° F. (38° C.), to produce an underblown asphalt composition; and (3) mixing a sufficient amount of a polyphosphoric acid throughout the underblown asphalt composition while the underblown asphalt composition is maintained at a temperature which is within the range of 200° F. (93° C.) to 550° F. (288° C.) to attain a softening point which is within the range of 185° F. (85° C.) to 250° F. (121° C.) and a penetration value of at least 15 dmm to produce the industrial asphalt.

The present invention also reveals a method for preparing an industrial asphalt comprising (1) heating an asphalt flux to a temperature which is within the range of about 200° F. (93° C.) to 400° F. (204° C.) to produce a hot asphalt flux, (2) adding from about 0.1 weight percent to about 10 weight percent of a polyphosphoric acid to the hot asphalt flux, (3) mixing the polyphosphoric acid throughout the hot asphalt flux to prepare a polyphosphoric acid containing asphalt flux, (4) heating the polyphosphoric acid containing asphalt flux to a temperature which is within the range of about 400° F. (204° C.) to about 550° F. (288° C.) to produce a hot polyphosphoric acid containing asphalt flux, (5) sparging an oxygen containing gas through the hot polyphosphoric acid containing asphalt flux for a period of time which is sufficient to increase the softening point of the polyphosphoric acid containing asphalt flux to a value which is within the range of 185° F. (85° C.) to 250° F. (121° C.) and a penetration value of at least 15 dmm to produce the industrial asphalt.

DETAILED DESCRIPTION OF THE INVENTION

The process of this invention is particularly useful in treating hard asphalt flux to produce industrial asphalt that is useful in roofing applications. More specifically, hard asphalt flux can be treated by the process of this invention to produce industrial asphalt that has a softening point which is within the range of 185° F. (85° C.) to 250° F. (121° C.) and a penetration value of at least 15 dmm. In most cases, the industrial asphalt will have a penetration value which is within the range of 15 dmm to 35 dmm. Industrial asphalt that is made by the process of this invention for utilization in roofing applications will typically have a softening point which is within the range of 185° F. (85° C.) to 250° F. (121° C.) and a penetration value which is within the range of 15 dmm to 35 dmm. Industrial asphalt made by the process of this invention for roofing applications will preferably have a softening point which is within the range of 190° F. (88° C.) to 210° F. (99° C.) and a penetration value which is within the range of 15 dmm to 25 dmm.

The asphalt flux is normally the petroleum residue from a vacuum distillation column used in refining crude oil. The asphaltic material used as the starting material can also be solvent extracted asphalt, naturally occurring asphalt, or synthetic asphalt. Blends of such asphaltic materials can also be treated by the process of this invention. The asphalt flux can also include polymers, recycled tire rubber, recycled engine oil residues recycled plastics, softeners, antifungal agents, biocides (algae inhibiting agents), and other additives. Tar and pitch can also be used as the starting material for treatment by the technique of this invention.

The hard asphalt flux is characterized in that it cannot be air blown to attain both a softening point which is within the range of 185° F. (85° C.) to 250° F. (121° C.) and a penetration value of at least 15 dmm. However, it should be understood that the process of this invention is also applicable to the treatment of virtually any asphaltic materials in addition to hard asphalt flux. The technique of this invention is of particular value in the treatment of hard asphalt flux that is difficult or impossible to air blow utilizing standard air blowing methods into industrial asphalt having properties suitable for use in roofing applications.

In the first step of the process of this invention the asphalt flux, typically a hard asphalt flux, is heated to a temperature which is within the range of about 400° F. (204° C.) to 550° F. (288° C.) to produce a hot asphalt flux. Then the asphalt flux is air blown to a softening point of at least 100° F. (38° C.) to produce an underblown asphalt composition by blowing an oxygen containing gas through the hot asphalt flux through a sparger for a period of time. Finally a sufficient amount of a polyphosphoric acid is mixed throughout the underblown asphalt composition while the underblown asphalt composition is maintained at a temperature which is within the range of 200° F. (93° C.) to 550° F. (288° C.) to attain a softening point which is within the range of 185° F. (85° C.) to 250° F. (121° C.) and a penetration value of at least 15 dmm to produce the industrial asphalt. In most cases the polyphosphoric acid modified underblown asphalt composition will be maintained at the elevated temperature for a period of time which is typically within the range of about 10 minutes to about 2 hours. Typically about 0.1 weight percent to about 10 weight percent of the polyphosphoric acid will be added to the underblown asphalt composition. More typically, about 0.2 weight percent to about 5 weight percent of the polyphosphoric acid will be added to the underblown asphalt composition.

In one embodiment of this invention, a sufficient amount of the polyphosphoric acid will be added to attain the desired softening point and penetration value without the need for any additional air blowing. In such a scenario, it is not necessary to continue to blow the oxygen containing gas through the underblown asphalt after the polyphosphoric acid is added. In such a case, the temperature of the underblown asphalt composition can also be reduced to a level which is under typical air blowing temperatures (400° F. (204° C.) or less). For instance, the temperature of the underblown asphalt could be reduced to be within the range of about 200° F. (93° C.) to 400° F. (204° C.) which is high enough to allow for good dispersion of the polyphosphoric acid throughout the underblown asphalt composition. However, in such a scenario, some type of mechanical agitation is typically needed to attain a relatively homogenous mixture of the polyphosphoric acid throughout the underblown asphalt flux.

In another embodiment of this invention, the air blowing can be continued after the addition of the polyphosphoric acid. In this scenario, the oxygen containing gas will continue to be blown through the underblown asphalt until the desired softening point and penetration values are attained. The temperature in such a case will be maintained at a level which is within the range of 400° F. (204° C.) to 550° F. (288° C.).

In still another embodiment of this invention, the polyphosphoric acid is added to the asphalt flux prior to treatment by air blowing. In this procedure, the air blowing is again conducted for the period of time which is required to attain the desired softening point and penetration value for the industrial asphalt. In this scenario, generally all of the polyphosphoric acid needed is added prior to commencement of air blowing. However, additional polyphosphoric acid can be added at any point during the air blowing procedure as desired in amounts and in conjunction with an air blowing time that will, result in the desired combination of softening point and penetration value for the industrial asphalt.

The polyphosphoric acids ($H_{n+2}P_nO_{3n+1}$, where n>1) that can be used in the practice of this invention are of the structural formula:

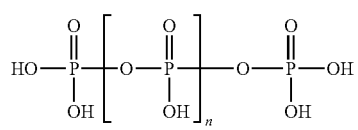

wherein n represents an integer from 0 to about 10. The polyphosphoric acid used will typically be a mixture that contains about 55% tripolyphosphoric acid with the reminder of the mixture being other polyphosphoric acids and some phosphoric acid. The polyphosphoric acid can optionally be superphosphoric acid ($H_3PO_4$ equivalent concentration of 105%). The polyphosphoric acid used will more typically have a $H_3PO_4$ equivalent concentration which is within the range of about 115% to about 117%. Normally the polyphosphoric acid will have a viscosity at 100° C. that is within the range of 36 cP to 1,010 cP.

Superphosphoric acid is represented by a formula of $H_{3.3}P_{1.3}O_5$ and a molecular weight of approximately 125 and polyphosphoric acid is represented by a molecular formula of approximately $H_{5.5}P_{3.5}O_{11.5}$ and a molecular weight of approximately 296. Superphosphoric acid having a $H_3PO_4$ equivalent concentration of 105% typically has an orthophosphoric content of about 49%, pyrophosphoric content of about 42%, triphosphoric content of about 8%, and tetraphosphoric content of about 1%. Polyphosphoric acid having a $H_3PO_4$ equivalent concentration of 115% generally contains about 5% orthophosphoric acid, about 16% pyrophosphoric acid, about 17% triphosphoric acid, about 16% tetraphosphoric acid, and 46% higher acids. Polyphosphoric acid having $H_3PO_4$ equivalent concentration of 117% contains typically about 2% orthophosphoric acid, about 7% pyrophosphoric acid, about 8% triphosphoric acid, about 11% tetraphosphoric acid, and 72% higher acids (see, FMC Technical Data Sheet, CAS No. 8017-16-1).

The asphalt flux is air blown by heating it to temperature which is within the range of 400° F. (204° C.) to 550° F. (288° C.) and blowing an oxygen containing gas through it. This air blowing step will preferably be conducted at a temperature which is within the range of 425° F. (218° C.) to 525° F. (274° C.) and will most preferably be conducted at a temperature which is within the range of 450° F. (232° C.) to 500° F. (260° C.). This air blowing step will typically take about 2 hours to about 8 hours and will more typically take about 3 hours to about 6 hours. However, the air blowing step will be conducted for a period of time that is sufficient to attain the ultimate desired softening point. In other words, the asphalt flux will be air blown until a softening point of at least 100° F. (38° C.) is attained.

The oxygen containing gas (oxidizing gas) is typically air. The air can contain moisture and can optionally be enriched to contain a higher level of oxygen. Chlorine enriched air or pure oxygen can also be utilized in the air blowing step. Air blow can be performed either with or without a conventional air blowing catalyst. Some representative examples of air blowing catalysts include ferric chloride ($FeCl_3$), phosphorous pentoxide ($P_2O_5$), aluminum chloride ($AlCl_3$), boric acid ($H_3BO_3$), copper sulfate ($CuSO_4$), zinc chloride ($ZnCl_2$), phosphorous sesquesulfide ($P_4S_3$), phosphorous pentasulfide ($P_2S_5$), phytic acid ($C_6H_6[OPO-(OH)_2]_6$), and organic sulfonic acids.

The industrial asphalt made can be used in making roofing products and other industrial products using standard procedures. For instance, the industrial asphalt can be blended with fillers, stabilizers (like limestone, stonedust, sand, granule, etc.), polymers, recycled tire rubber, recycled engine oil residue, recycled plastics, softeners, antifungal agents, biocides (algae inhibiting agents), and other additives.

This invention is illustrated by the following examples that are merely for the purpose of illustration and are not to be regarded as limiting the scope of the invention or the manner in which it can be practiced. Unless specifically indicated otherwise, parts and percentages are given by weight.

EXAMPLES 1-3

In this series of experiments a hard asphalt flux (Asphalt I) was air blown (in Example 1) utilizing standard air blowing procedures to a softening point of 208.1° F. using a standard air blowing procedure. The hard asphalt flux was air blown in a laboratory scale air blow unit at a temperature of 500° F.±20° F. (260° C.±11° C.). The laboratory air blow unit had a capacity of 3 liters. In the procedure used, air was blown through a sparger into the hot asphalt flux at a rate of 5-6 liters/min at a pressure of 15 psi (103 kilopascals). It was determined to have a penetration value of only 14.5 dmm at 77° F. (25° C.). Accordingly, the specification for utilization in manufacturing roofing shingles was not achieved by air blowing this asphalt using standard procedures. For purposes of this invention, asphalt softening points were measured following ASTM D 36-95 "Standard Test Method for Softening Point of Bitumen (Ring-and Ball Apparatus)" and asphalt penetrations were measured following ASTM D 5-97 "Standard Test Method for Penetration of Bituminous Materials".

In another experiment (Example 2) the same asphalt (Asphalt I) was air blown to a softening point of 185° F. (85° C.) at which point it had a penetration value of 21 dmm at 77° F. (25° C.). Then, in another experiment (Example 3) the air blown asphalt made in Example 2 was treated with 1 weight percent of polyphosphoric acid. This was done by simply dispersing the polyphosphoric acid into the previously air blown asphalt at an elevated temperature. This treatment of the asphalt with polyphosphoric acid increased its softening point to 213° F. (101° C.) and decreased its penetration value to 17.5 dmm. Accordingly, the asphalt possessed the ASTM D 3462-96 requirements for roofing shingle manufacture after being treated with the polyphosphoric acid. This experiment shows that hard asphalt flux can be underblown and then treated with polyphosphoric acid to attain both the softening point and penetration values needed for utilization in roofing shingle applications.

The control asphalt I in Example 1 has a durability of 70 cycles, and the polyphosphoric acid modified asphalt I in Example 3 had a durability of 92 cycles. This experiment accordingly shows that the durability of industrial asphalt can be improved by treating it with polyphosphoric acid. In this invention, asphalt durability (weathering resistance) is defined as the cycle-to-failure in a weather-o-meter according to ASTM D 4798-00 "Standard Test Method for Accelerated Weathering Test Method Conditions and Procedures for Bituminous Materials (Xeon-Arc Method)" Cycle A. Asphalt failure was determined according to ASTM D 1670.

The results attained in this series of experiments (the softening point, penetration, and durability values attained for asphalts after air blowing) are summarized in Table 1.

TABLE 1

| Example | Composition | Softening point | Penetration at 77° F. | Durability |
|---|---|---|---|---|
| 1 | Asphalt I | 208° F. (98° C.) | 14.5 dmm | 70 cycles |
| 2 | Asphalt I | 185° F. (85° C.) | 21 dmm | Not available |
| 3 | Asphalt I + 1.0% polyphosphoric acid | 213° F. (101° C.) | 17.5 dmm | 92 cycles |

EXAMPLES 4-6

In this series of experiments a hard asphalt flux (Asphalt II) was air blown (in Example 4) utilizing standard air blowing procedures to a softening point of 211° F. (99° C.). It was determined to have a penetration value of only 14 dmm at 77° F. (25° C.). Accordingly, the specification for utilization in manufacturing roofing shingles was not achieved by air blowing this asphalt using standard procedures.

In another experiment (Example 5) the same asphalt (Asphalt II) was air blown to a softening point of 175° F. at which point it had a penetration value of 21.5 dmm at 77° F. (25° C.). Then, in another experiment (Example 6) the air blown asphalt made in Example 5 was treated with 0.5 weight percent of polyphosphoric acid. This was done by simply dispersing the polyphosphoric acid into the previously air blown asphalt at an elevated temperature. This treatment of the asphalt with polyphosphoric acid increased its softening point to 201.5° F. (94.2° C.) and increased its penetration value to 19.5 dmm. Accordingly, the asphalt possessed the ASTM D 3462-96 requirements for roofing shingle manufacture after being treated with the polyphosphoric acid. This experiment again shows that hard asphalt flux can be underblown and then treated with polyphosphoric acid to attain both the softening point and penetration values needed for utilization in roofing shingle applications.

The control asphalt II in Example 4 had a durability of 62 cycles, and the polyphosphoric acid modified asphalt II in Example 6 had a durability of 86 cycles. This experiment accordingly shows that the durability of industrial asphalt can be improved by treating it with polyphosphoric acid.

It took 240 minutes to finish air blowing the control asphalt II in Example 4, and for polyphosphoric acid modified asphalt II in Example 6, the blow time was 210 minutes. This represents a reduction of 30 minutes in the air blow time required. This experiment accordingly shows that the air blow time of industrial asphalt can be reduced by treating it with polyphosphoric acid. A reduced air blow time is beneficial because it results in energy savings in the air blow process.

The results attained in this series of experiments (the softening point, penetration, durability, and air blow time values attained for asphalts after air blowing) are summarized in Table 2.

TABLE 2

| Example | Composition | Softening point | Penetration at 77° F. (25° C.) | Durability | Blow time |
|---|---|---|---|---|---|
| 4 | Asphalt II | 211° F. (99° C.) | 14 dmm | 62 cycles | 240 min |
| 5 | Asphalt II | 175° F. (79° C.) | 21.5 dmm | Not available | Not available |
| 6 | Asphalt II + 0.5% polyphosphoric acid | 201.5° F. (94.2° C.) | 19.5 dmm | 86 cycles | 210 min |

EXAMPLES 7-8

Example 7 was conducted as a control. In this experiment a hard asphalt flux (Asphalt III) was air blown to a final softening point of 203° F. (95° C.). However, the penetration attained was only 14 dmm at 77° F. (25° C.). Accordingly, the specification for utilization in manufacturing roofing shingles was not achieved.

In Example 8 the hard asphalt flux used in Example 7 was again air blown. However, in this experiment, 1 weight percent polyphosphoric acid was mixed into the asphalt flux before it was air blown. In this procedure the asphalt was air blown to a final softening point of 210° F. (99° C.). The penetration attained was 16.5 dmm. Accordingly, the procedure of this invention resulted in the asphalt product made meeting the specifications for roofing asphalt. In other words, the blown asphalt made in Example 8 possessed the ASTM D 3462-96 requirements for roofing shingle manufacture.

The control asphalt III in Example 7 had a durability of 72.5 cycles, and the polyphosphoric acid modified asphalt III in Example 8 had a durability of 114.5 cycles. This experiment accordingly shows that the durability of industrial asphalt can be improved by treating it with polyphosphoric acid.

The results attained in this series of experiments (the softening point, penetration and durability values attained for the blown asphalts) are summarized in Table 3.

TABLE 3

| Example | Composition | Softening point | Penetration at 77° F. (25° C.) | Durability |
|---|---|---|---|---|
| 7 | Asphalt III | 203° F. (95° C.) | 14 dmm | 72.5 cycles |
| 8 | Asphalt III + 1.0% polyphosphoric acid | 210° F. (99° C.) | 16.5 dmm | 114.5 cycles |

While certain representative embodiments and details have been shown for the purpose of illustrating the subject invention, it will be apparent to those skilled in this art that various changes and modifications can be made therein without departing from the scope of the subject invention.

What is claimed is:

1. A method for preparing an industrial asphalt from a hard asphalt flux comprising (1) heating the hard asphalt flux to a temperature which is within the range of about 400° F. to 550° F. to produce a hot asphalt flux, (2) sparging an oxygen containing gas through the hot asphalt flux for a period of time which is sufficient to increase the softening point of the asphalt flux to a value which is within the range of 100° F. to 175° F., to produce an underblown asphalt composition, and (3) mixing a sufficient amount of a polyphosphoric acid throughout the underblown asphalt composition while the underblown asphalt composition is maintained at a temperature which is within the range of 200° F. to 550° F. to attain a softening point which is within the range of 185° F. to 250° F. and a penetration value of at least 15 dmm to produce the industrial asphalt.

2. A method as specified in claim 1, wherein the industrial asphalt has a softening point which is within the range of 185° F. to 235° F., and wherein the industrial asphalt has a penetration value which is within the range of 15 drum to 35 dmm.

3. A method as specified in claim 1, wherein the industrial asphalt has a softening point which is within the range of 190° F. to 220° F., and wherein the industrial asphalt has a penetration value which is within the range of 15 dmm to 25 dmm.

4. A method as specified in claim 1 wherein the mixing in step (3) is fulfilled by mechanical agitation.

5. A method as specified in claim 1 wherein the mixing in step (3) is fulfilled by bubbling an inert gas through the hot polyphosphoric acid modified underblown asphalt composition.

6. A method as specified in claim 1 wherein the amount of polyphosphoric acid added to the hot asphalt flux in step (3) is within the range of 0.1 weight percent to 10 weight percent.

7. A method as specified in claim 1 wherein the polyphosphoric acid has a $H_3PO_4$ equivalent concentration which is within the range of about 115% to about 117%.

8. A method as specified in claim 1 wherein the polyphosphoric acid has a $H_3PO_4$ equivalent concentration of about 105%.

9. A method as specified in claim 1 wherein the oxygen containing gas is air.

10. A method as specified in claim 1 wherein the oxygen containing gas is sparged through the hot asphalt flux in step (2) which is maintained within the range of about 400° F. to 550° F. for a period of time which is within the range of 30 minutes to 8 hours.

11. A method as specified in claim 1 wherein the polyphosphoric acid modified underblown asphalt composition is maintained in step (3) at a temperature which is within the range of 200° F. to 550° F. and is mixed for a period of time which is within the range of about 10 minutes to about 4 hours.

12. A method as specified in claim 1 wherein the oxygen containing gas is sparged through the hot polyphosphoric acid modified asphalt flux in the presence of an air blowing catalyst.

13. A method as specified in claim 1 wherein the polyphosphoric acid modified underblown asphalt composition is maintained in step (3) at a temperature which is within the range of 200° F. to 550° F. for a period of time which is within the range of about 10 minutes to about 4 hours with an inert gas blanket.

14. A method as specified in claim 9 wherein the air is enriched with oxygen.

15. A method as specified in claim 9 wherein the air is enriched with chlorine.

16. A method as specified in claim 1 wherein the oxygen containing gas is oxygen.

17. A method as specified in claim 1 wherein the hot asphalt flux is void of phosphorus pentoxide.

18. A method as specified in claim 17 wherein the polyphosphoric acid is of the structural formula:

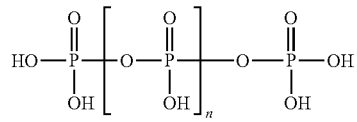

wherein n represents an integer from 0 to about 10.

* * * * *